US011736607B1

(12) United States Patent
Liu

(10) Patent No.: US 11,736,607 B1
(45) Date of Patent: *Aug. 22, 2023

(54) USER-CONFIGURABLE RECORDING OF VOIP CALLS

(71) Applicant: 8x8, Inc., Campbell, CA (US)

(72) Inventor: Zhishen Liu, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,580

(22) Filed: Aug. 9, 2021

Related U.S. Application Data

(63) Continuation of application No. 16/539,777, filed on Aug. 13, 2019, now Pat. No. 11,102,348, which is a continuation of application No. 15/708,757, filed on Sep. 19, 2017, now Pat. No. 10,382,621, which is a continuation of application No. 14/577,561, filed on Sep. 19, 2014, now Pat. No. 9,769,312.

(51) Int. Cl.
*H04M 3/42* (2006.01)
*G06F 21/62* (2013.01)

(52) U.S. Cl.
CPC .... *H04M 3/42221* (2013.01); *G06F 21/6218* (2013.01)

(58) Field of Classification Search
CPC .......... H04M 3/42221; G06F 21/6218; G11B 31/00; G11B 19/02; G11B 27/031
See application file for complete search history.

(56) References Cited

U.S. PATENT DOCUMENTS

| 7,218,721 | B1 | 5/2007 | Vincent et al. |
| 8,619,967 | B2 | 12/2013 | Southwick et al. |
| 8,781,102 | B2* | 7/2014 | Conway .............. H04M 3/5183 379/265.06 |
| 8,781,105 | B1 | 7/2014 | Duva et al. |
| 8,804,940 | B2 | 8/2014 | Southwick et al. |
| 8,817,801 | B1 | 8/2014 | Narayanaswamy |
| 9,576,135 | B1* | 2/2017 | Komandoor Elayavilli ................ G06F 21/32 |
| 9,703,838 | B1* | 7/2017 | Hampson .......... G06F 16/24578 |
| 9,769,312 | B1 | 9/2017 | Liu |
| 10,382,621 | B1 | 8/2019 | Liu |
| 2007/0263794 | A1 | 11/2007 | Mocenigo |

* cited by examiner

*Primary Examiner* — Chandrahas B Patel
(74) *Attorney, Agent, or Firm* — Crawford Maunu PLLC

(57) ABSTRACT

Various example implementations are directed to circuits, apparatuses, and methods for providing data communications services such as voice-over-IP (VoIP). According to an example embodiment, an apparatus includes one or more VoIP servers configured and arranged to route VoIP calls to and from users of a plurality of customer accounts. Each customer account has a respective plurality of users and a respective settings file. For each of the customer accounts, a processing circuit communicatively coupled to the VoIP servers, records an audio portion of a VoIP call to or from a user of the customer account in response to the VoIP call satisfying a set of recording criteria specified in the settings file for the customer account. The recording criteria for at least one of the customer accounts includes account-level settings for selecting VoIP calls to be recorded and sets of user-level settings indicating criteria for preventing recording of VoIP calls of the individual users.

20 Claims, 3 Drawing Sheets

USER-CONFIGURABLE RECORDING OF VOIP CALLS

OVERVIEW

Computing servers are increasingly being used to provide various voice-over-IP VoIP communication services over a network including for a wide range of customer applications including, but not limited to, residential/business telephony services, video conferencing, dictation/transcription, call centers, intercom service, and/or remote monitoring services. Due to the wide variety of applications that may use VoIP communication, it is difficult to provide features and services for VoIP communications that are tailored to meet the needs of all customer accounts. Similarly, for customer accounts having multiple users (e.g., employees in a company), it is difficult to provide features and services that satisfy the needs and/or preferences of all users of the account.

Various example implementations are directed to circuits, apparatuses, and methods for providing respective VoIP services for a plurality of customer accounts with customizable recording of VoIP calls according to a respective set of settings for each account. The ability to customize settings for each customer account, allows recording of VoIP communications to be used in wide variety of business and residential applications (e.g., transcription services, conference call recording, and/or monitoring and review of calls in a call center). In some implementations, the settings for each customer account may be adjusted by individual users to customize recording of VoIP calls to/from the user (e.g., to adjust needs and/or privacy concerns of the user).

According to an example embodiment, an apparatus includes one or more VoIP servers configured and arranged to route VoIP calls to and from users of a plurality of customer accounts. Each customer account has a respective plurality of users and a respective settings file. For each of the customer accounts, a processing circuit communicatively coupled to the VoIP servers, records an audio portion of a VoIP call to or from a user of the customer account in response to the VoIP call satisfying a set of recording criteria specified in the settings file of the customer account. For at least one of the customer accounts, the recording criteria includes account-level settings and user-level settings for one or more users of the account. The account-level settings indicate criteria for selecting VoIP calls to be recorded. The user-level settings for a user indicate criteria for preventing discernible recording of VoIP calls that have been selected by the criteria indicated in the account-level settings.

According to another example embodiment, a method for providing VoIP services for a plurality of customer accounts is disclosed. For each of a plurality of customer accounts, one or more VoIP servers are used to route VoIP calls to and from a plurality of users of the customer account. An audio portion of a VoIP call to or from a user of one of the customer accounts is recorded in response to the VoIP call satisfying a set of recording criteria specified in a respective settings file of the customer account. For at least one of the customer accounts, the recording criteria includes account-level settings and user-level settings for one or more users of the account. The account-level settings indicate criteria for selecting VoIP calls to be recorded. The user-level settings for a user indicate criteria for preventing discernible recording of VoIP calls of the user that are selected by the criteria indicated in the account-level settings.

BRIEF DESCRIPTION OF THE DRAWINGS

The invention may be more completely understood in consideration of the following detailed description of various embodiments of the invention in connection with the accompanying drawings, in which.

Figure 1:
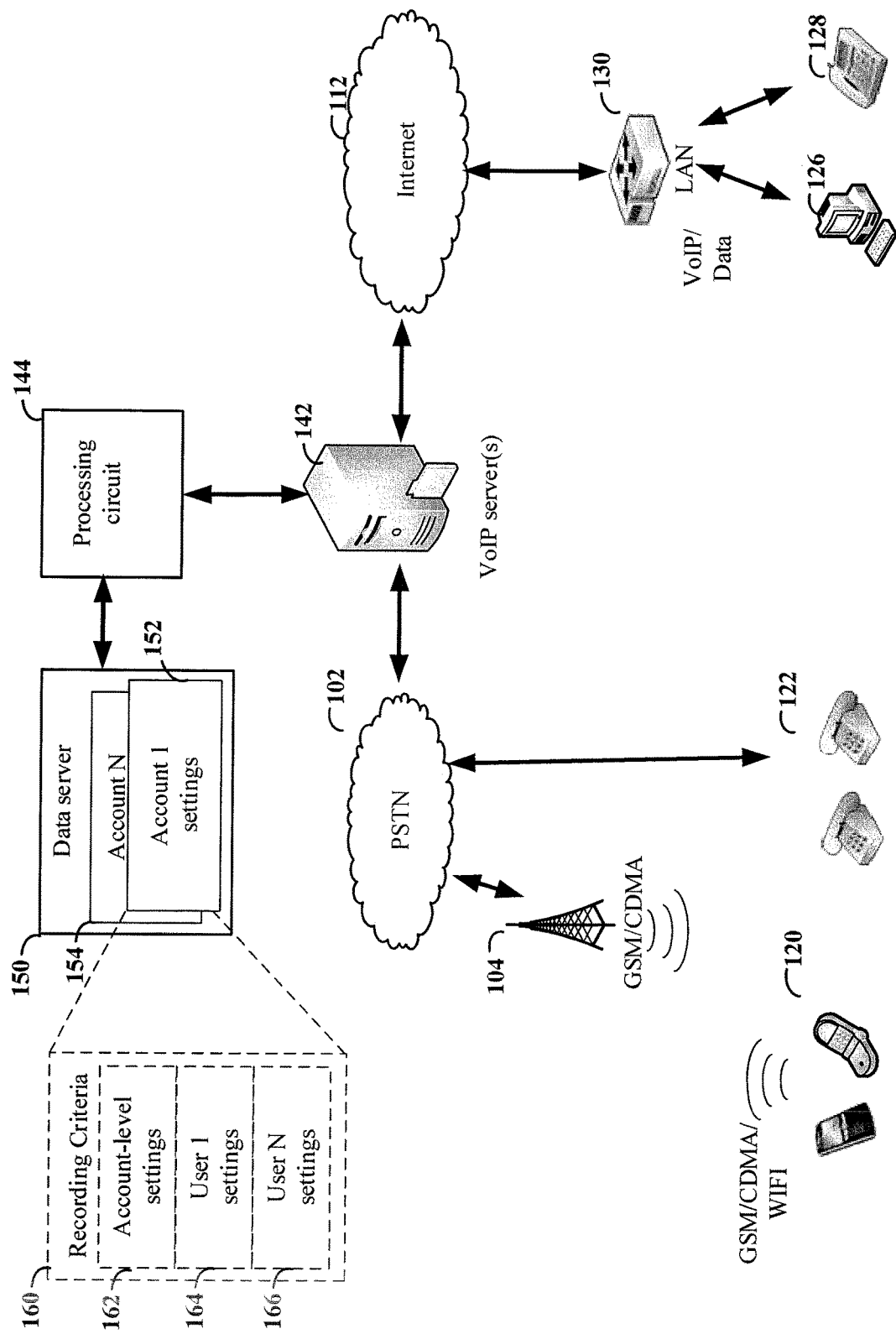
FIG. 1 shows an example communication network for routing VoIP calls and a processing circuit for recording of VoIP calls, consistent with one or more embodiments.

While various embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure are believed to be applicable to a variety of different types of apparatuses, systems, and methods involving for providing customizable VoIP communications for a plurality of customer accounts. In certain implementations, aspects of the present disclosure have been shown to be beneficial in the context of customizable recording VoIP communications to respective a set of recording criteria for each customer account or respective recording criteria for individual users of the customer accounts. For ease of explanation, examples and embodiments may primarily be discussed with reference to VoIP calls to/from users of customer accounts. While not necessarily so limited, various aspects may be appreciated through a discussion of examples using such exemplary contexts.

In one or more embodiments, an apparatus includes VoIP servers configured to route VoIP calls to and from users of a plurality of customer accounts. Each of the customer accounts has a respective plurality of users and a respective settings file. A processing circuit communicatively coupled to the VoIP servers is configured to record audio of VoIP calls for each of the customer accounts according to the settings file for the customer account. For instance, the processing circuit records an audio portion of a VoIP call to or from a user of a customer account in response to the VoIP call satisfying a set of recording criteria specified in the settings file for the customer account.

Different customer accounts may utilize various criteria to determine whether or not a VoIP call for the customer account should be recorded. For instance, recording criteria for a first account may direct the processing circuit to record all VoIP calls for the account. Recoding criteria for a second account may direct the processing circuit to only record a subset of VoIP calls for the account that have certain characteristics. VoIP calls may be selected to be recorded based on various characteristics specified by the recording criteria for the account including, but not limited to, source or destination numbers of the VoIP call, time or date of the VoIP call, geolocation of call participants, in-call user input, voice recognition triggers, teleconference schedules and/or applicable fees for the call.

In some embodiments, the recording criteria for an account may include multiple levels of recording criteria. For example, the recording criteria for an account may include account-level settings applicable to VoIP calls of all users and user-level settings applicable to VoIP calls of individual users. The account-level settings indicate criteria for selecting calls to be recorded from the VoIP calls of all users of the account. The user-level settings of a user may indicate criteria for selecting VoIP calls of the user to be recorded. In some instances, the user-level settings may additionally or alternatively specify criteria for identifying calls that should not be recorded. For instance, a user may configure user-level settings to prevent discernible recording of calls to or from a user-defined list of personal numbers. For ease of reference, criteria in the user-level settings used to indicate calls that should not be recorded may be referred to as exclusion criteria. If exclusion criteria is satisfied by a VoIP call, recording of the VoIP call is prevented even if account level settings indicate that the call should be recorded.

In some implementations, the user-level settings may allow a user to override the account-level settings. As an illustrative example, a corporation may create a customer account to provide VoIP services for its employees. To improve services provided by the employees, for example customer service in a call center, the company may wish to record business related VoIP calls for later review. The account-level settings may be configured to select VoIP calls in a department of interest (e.g., customer service). However to protect employee privacy, user-level settings may be configured to prevent recording of certain calls selected by the account-level settings. For instance, an employee may set user-level settings to prevent recording of calls to or from a list of personal contact numbers of the employee. In some embodiment, the processing circuit may further protect privacy by providing an audio notification to call participants that the call is being or may be recorded.

Different implementations may use different techniques to prevent discernable recording VoIP calls of a user. In some implementations, discernable recording of a VoIP call may be prevented by disabling recording of VoIP calls of the user by the processing circuit. In some other implementations, discernable recording of a VoIP call may be prevented by encrypting the VoIP call. Encrypting of VoIP calls may also prevent recording of third parties, which transport VoIP data between participants of a VoIP call (e.g., PSTN or cellular network providers).

The settings file for a customer account may specify settings for various options for recording, storage, and/or processing of VoIP calls. For example, in some embodiments, the settings file may specify a recording quality (e.g., bit-rate) or codec (e.g., WAV, MP3, or FLAC) that should be used for recording VoIP calls for the customer account or for individual users.

As another example, the settings file for a customer account may specify settings for storing audio recordings of the VoIP calls. Different embodiments may utilize various storage options for storing audio recordings of VoIP calls. In some implementations, the processing circuit may store audio recordings of VoIP calls in a local data storage included in the apparatus or connected thereto via a local-area-network. In some other implementations, the processing circuit may store audio recordings of VoIP calls in a data storage remote to the apparatus (e.g., connected to the apparatus via the internet or other wide-area network). In some implementations, the processing circuit may store recorded VoIP calls for a customer account in a local or remote data storage specified in the settings file for the account. In some implementations, the processing circuit logs into a data server, using login credentials included in a settings file, and stores a recorded VoIP call in the remote data server. For ease of explanation, the examples are primarily described with reference to storage of recorded VoIP calls in a single data storage device or server. However, the embodiments are not so limited. For instance, in some embodiments, a processing circuit may store recorded VoIP calls using multiple local or remote data storage devices or servers. For instance, a user may adjust user settings to store recorded VoIP calls in several free or paid cloud-based data servers (e.g., DROPBOX, GOOGLE DRIVE, and/or AMAZON CLOUD). The processing circuit may select which remote data server to use based on a number of factors that may be specified in the set of criteria (e.g., available user storage on the remote data servers, transfer speeds to the remote data servers, and/or monetary cost for backup to the remote data servers). In some embodiments, the settings file may be configured to direct the processor to encrypt a recorded VoIP call prior to storing it on the local or remote storage device. The settings file may specify encryption settings including, for example, encryption cipher and encryption key or key size.

In some embodiments, the settings file for a customer account may be configured to cause the processing circuit to transcribe recorded VoIP calls for the customer account or individual users. For instance, after recording a VoIP call the processing circuit may perform voice recognition to generate a transcription of the VoIP call. In some implementations, the transcription may be used by the processing circuit to trigger additional actions to be performed by the processor. As one example, the processor may be configured to send an alert to a user in response to the transcription including a trigger word indicated in the settings file. For instance, the settings file for a customer service call center may be configured to flag a VoIP call for review if the transcription includes profanity.

In some implementations, the processing circuit is also configured to provide a graphical user interface GUI (e.g., an interactive website) for an authorized user(s) to review/adjust the recording criteria and/or other settings of a user account. In some embodiments, the GUI may also allow users to review/adjust user-level settings of the recording criteria. In some implementations, the GUI may allow an authorized user(s) to listen to and/or transcribe recorded VoIP calls. The GUI may also allow an authorized user(s) to forward or share recordings or transcriptions of VoIP calls.

In some implementations, the GUI provides a teleconference interface for scheduling or conducting a teleconference. The teleconference interface may provide various options to the conference participants. For example, the GUI may include a mechanism for users to imitate recording or transcription of the teleconference. As another example, the GUI may include a mechanism for participants to exchange files or collaborate on a shared workspace during the teleconference.

Turning now to the figures, FIG. 1 shows an example communication network for routing VoIP calls and a processing circuit for recording of VoIP calls, consistent with one or more embodiments. The communication network includes a VoIP server 142 configured to VoIP services for users of a plurality of customer accounts. The users may place or receive VoIP calls using various end-point devices including, e.g., mobile devices 120, plain-old telephones (POTS) 122, computer(s) 126, and/or IP phones 128. VoIP calls may be routed to or from the end-point devices over various data networks including, e.g., the internet 112, public service telephone networks 102, cellular networks 104, and wired or wireless private data networks (e.g., LAN 130, and/or Private Branch Exchange servers (not shown)).

A processing circuit 144 is communicatively coupled to the VoIP server 142. The communicative-coupling of the VoIP server 142 and processing circuit 144 may include either a direct connection or an indirect connection having, e.g., multiple connections, relay nodes, and/or networks in a communication path between the VoIP server 142 and processing circuit 144.

The processing circuit 144 is configured to monitor VoIP calls routed by the VoIP server 142 for each of the customer accounts and record a VoIP call in response to the call satisfying respective recording criteria for the client account. In this example, the recording criteria 160 for each account is specified in a respective settings file 152 or 154 stored in a data server 150. In some implementations, the data server 150 may be a local data server connected to the processing circuit 144 directly or via a local area network. In some other implementations, the data server 150 may be remotely connected to the processing circuit 144, for example, via the internet 112.

The settings files 152 and 154 for customer accounts may utilize various recording criteria to determine whether or not VoIP calls should be recorded. The recording criteria may include, for example, source or destination numbers of the VoIP call, time or date of the VoIP call, geolocation of call participants, in-call user input, voice recognition triggers, teleconference schedules and/or applicable fees for the call. In this example, recording criteria 160 specified the settings file 152 includes a set of account-level settings 162 and sets of user-level settings 164 and 166 for individual users of the customer account. The account-level settings 162 indicate criteria for selecting calls to be recorded from the VoIP calls of all users of the account. The user-level settings 164 and 166 indicate criteria for selecting VoIP calls of an individual user to be recorded. In some instances, the user-level settings 164 and 166 may additionally or alternatively specify criteria for identifying calls to be excluded from recording.

As previously described, the processing circuit 144 may utilize various storage options for storing audio recordings of VoIP calls. In some implementations, the processing circuit 144 may store audio recordings of VoIP calls in the same data server 150 as the account settings file 152 and 154. In some other implementations, the processing circuit 144 may additionally or alternatively store the audio recordings of VoIP calls using one or more other data servers (not shown), which may be local or remote to the processing circuit 144.

In some implementations, the processing circuit 144 is also configured to provide a GUI (not shown) for an authorized user(s) to review/adjust the recording criteria 160 and/or other settings of a user account. For example, the processing circuit 144 may host an interactive web-site having a GUI with a mechanism for an authorized user to review/adjust the account-level settings 162 and/or user level settings (e.g., 164) of the recording criteria 160. In some implementations, the GUI may allow an authorized user(s) to listen to and/or transcribe recorded VoIP calls.

In some implementations, the GUI provides an interface for scheduling or conducting a teleconference. The teleconference interface may provide various options to the conference participants. For example, the GUI may include a mechanism for users to imitate recording or transcription of the teleconference. As another example, the GUI may include a mechanism for participants to exchange files or collaborate on a shared workspace during the teleconference.

Figure 2:
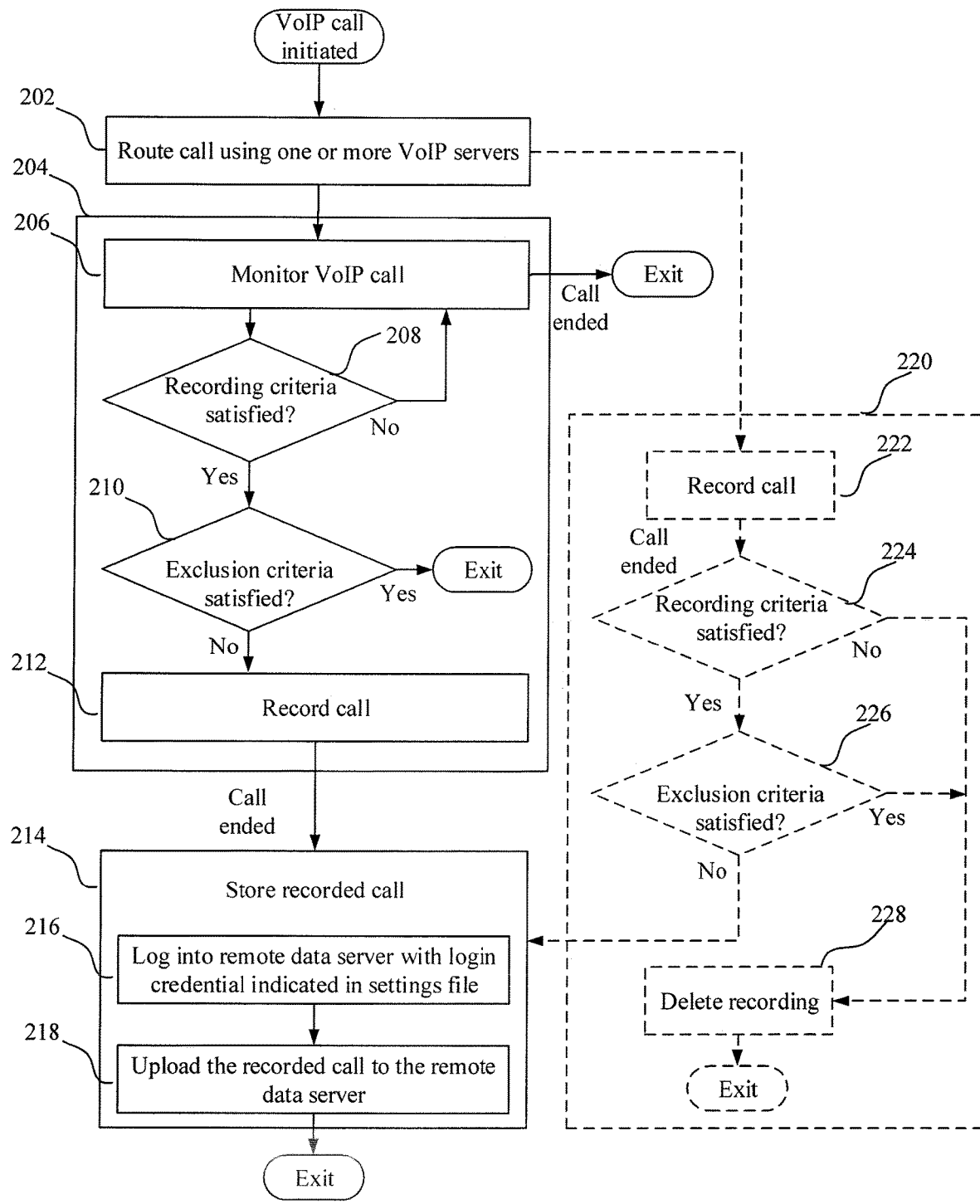
FIG. 2 shows an example process for recording VoIP calls for one of a plurality of customer accounts, according to a respective set of criteria specified in a respective settings file for the customer account.

FIG. 2 shows an example process for recording VoIP calls for one of a plurality of customer accounts, according to recording criteria specified in a respective settings file for the customer account. In response to a VoIP call being initiated, the VoIP call is routed using one or more VoIP servers at block 202.

Block 204 shows a first process for determining whether or not to record the VoIP call. The VoIP call is monitored at block 206 until the call ends or until the recording criteria for the customer account is satisfied at decision block 208. If the call ends before the recording criteria is satisfied, at decision block 208, the process exits without recording the VoIP call. If the recording criteria is satisfied, decision block 208 directs the process to decision block 210. As previously described, in some implementations, user-level settings may indicate exclusion criteria indicating calls that should not be recorded (e.g., personal calls). If exclusion criteria is satisfied at decision block 210, the process exits without recording the VoIP call. Otherwise, the VoIP call is recorded at block 212. After the call is ended, the process stores the recorded VoIP call at block 214.

As previously discussed, different embodiments may store recorded VoIP calls user various local or remote storage devices and/or according to storage options specified in the settings file for the customer account. In this example, the process stores a recorded VoIP by logging into a remote data server at block 216 using login credentials indicated in the settings file for the account and uploading the recorded VoIP call to the remote data server at block 218.

Block 220 shows a second alternative process (illustrated by dashed lines) for determining whether or not to record the VoIP call. In the second process, the VoIP call is automatically recorded at block 220 without regard to the recording criteria or exclusion criteria specified in the settings file for the customer account. Once the call has ended, the process proceeds to decision block 222 to determine whether or not the recorded call should be stored or discarded. If the recording criteria indicated in the settings file for the customer account is not satisfied at block 224, the recording of the VoIP call is deleted at block 228. Otherwise, if the recording criteria is satisfied at block 224, the process proceeds to decision block 226. If exclusion criteria is satisfied by the VoIP call, at decision block 226, the recording of the VoIP call is deleted at block 228. Otherwise, if exclusion criteria is not satisfied at decision block 226 or if no exclusion criteria is specified in the settings file for the customer account, the process stores the recorded VoIP call at block 214 as previously described.

As previously described, the recording criteria may utilize various characteristics of a VoIP call to determine whether or not the VoIP call should be recorded. For instance, VoIP calls may be selected to be recorded based on various characteristics including, but not limited to, source or destination numbers of the VoIP call, time or date of the VoIP call, geolocation of call participants, in-call user input, voice recognition triggers, teleconference schedules, and/or applicable fees for the call.

Figure 3:
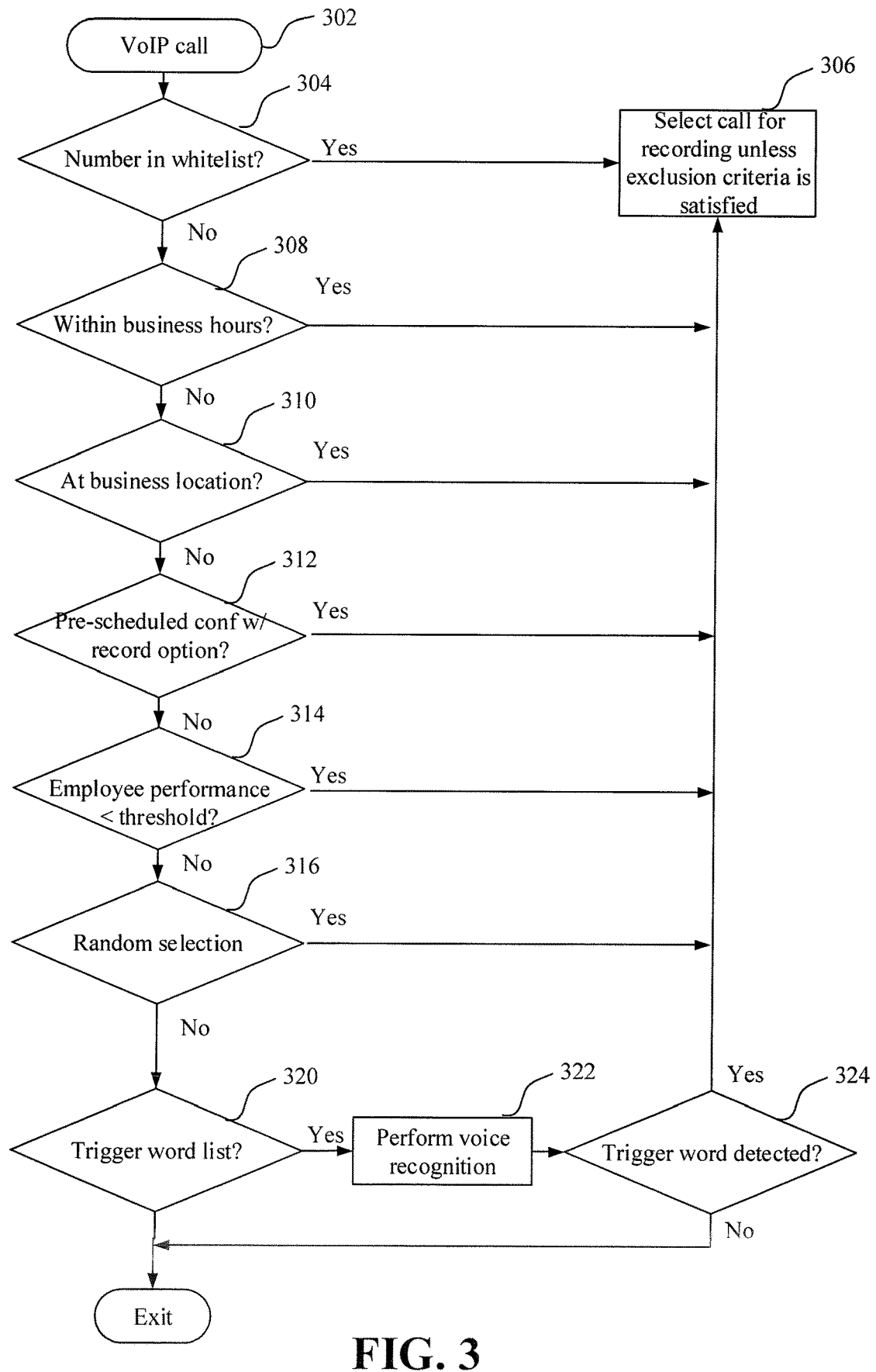
FIG. 3 shows a flowchart illustrating a decision process performed by an example set of recording criteria.

FIG. 3 shows a flowchart illustrating a decision process performed by an example set of recording criteria for selecting VoIP calls to be recorded. The process includes a number of decision blocks, which direct the process to block 306 if various characteristics of the VoIP call satisfy recording criteria in the settings file. At block 306, the VoIP call is selected for recording unless exclusion criteria indicates that recording of the VoIP call should be prevented.

In some implementations, the process includes one or more decision blocks that direct the process to block 306 if the VoIP call 302 has various characteristics indicating that the VoIP call is business related. For instance, a manager at a company may configure the recording criteria to identify and trigger recording of business related calls. In one example, decision block 304, directs the process to block 306 if the VoIP call 302 is to or from a number included in a whitelist specified in the settings file for the customer account. As another example, decision block 304, directs the process to block 306 if the VoIP call 302 is placed or received within business hours specified by the settings file for the account. As another example, decision block 310 directs the process to block 306 if the VoIP call 302 is to or from a VoIP-enabled device geographically located at a designated business location.

In some embodiments, users may optionally configure the recording criteria, when scheduling a teleconference, to cause the teleconference to be recorded. For example, decision block 312 directs the process to block 306 if the VoIP call 302 corresponds to a pre-scheduled conference having a recording option enabled. The ability to enable recording when scheduling a teleconference simplifies the call in process and allows scheduled teleconference participants to be notified in advance that the conference will be recorded.

In some embodiments, the recording criteria may be used to select VoIP calls for recording based on employee performance. For example, decision block 314 directs the process to block 306 if a user participant of the VoIP call 302 has a performance rating that is less than a threshold level. Such recording criteria may be useful, for example, in a call center to focus managerial review on low-performing employees. In some implementations, the recording criteria may additionally or alternatively perform a random selection of VoIP calls for recording and review. For instance, decision block 316 directs the process to block 306 based on a random selection. In some embodiments, the probability that a VoIP call will be selected for recording at decision block 316 is specified in the settings file for the customer account. In some implementations, the settings file for the customer account may specify a respective probability of selection for each user of the account. In some embodiments, the probability of selection may be specified in the settings file as a percentage of calls of the user that are to be recorded. For example, the probability of selection may be respectfully set to 100%, 50%, or 0% to record all, half, or none of the VoIP calls of a user.

In some embodiments, the recording criteria may be configured to select VoIP calls for recording based words spoken during the call. For instance, the recording criteria may be configured to record VoIP calls that include one or more words indicative of an emergency. In this example, if the recording criteria includes a trigger word list, decision block 320 directs the process to perform voice recognition at block 322. If the voice recognition detects a word in the trigger word list, decision block 324 directs the process to block 306.

In this example, the decision blocks 304, 308, 310, 312, 314, 316 and 320 primarily direct the process to recode the VoIP call in response to the call having individual characteristics. However, various embodiment may include more complex logic for selection of VoIP calls for recording including multiple characteristics in combination. For example, in some embodiments, the recording criteria may only select VoIP calls for recording if a destination/source number of the VoIP call is specified in a source list and the VoIP call is placed during business hours.

As previously indicated, in some implementations, the processing circuit may perform various processes in addition to recording of VoIP calls including, for example, transcription and/or encryption of recorded VoIP calls or generating of alerts. In some implementations, the processes may be enabled or disabled for a customer account and/or individual users according to settings in the account settings file for the account. The account settings file may cause the processing circuit to perform various processing for all VoIP calls or for select VoIP calls that satisfy certain criteria specified in the settings file. For example, as previously indicated, the processing circuit may perform various processes (e.g., alert generation) in response to a voice recognition indicating that a VoIP call includes certain trigger words specified in the account settings file.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a computing server, a network monitor and/or a GUI). For example, in certain of the above-discussed embodiments, one or more modules are discrete logic circuits or programmable logic circuits configured and arranged for implementing these operations/activities, as in the blocks shown in FIGS. 1, 2 and 3. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, in which the first module includes a first CPU hardware circuit with one set of instructions, and the second module includes a second CPU hardware circuit with another set of instructions.

Certain embodiments are directed to a computer program product (e.g., nonvolatile memory device), which includes a machine or computer-readable medium, having stored thereon, instructions which may be executed by a computer (or other electronic device) to perform these operations/activities.

The various embodiments described above are provided by way of illustration only and should not be construed to limit the disclosure. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features from another figure, even though the combination is not explicitly shown or explicitly described as a combination. The disclosure may also be implemented using a variety of approaches such as those involving a number of different circuits, operating systems, and/or software programs/packages. Such modifications and changes do not depart from the true spirit and scope of the present disclosure, including that set forth in the following claims.

What is claimed is:

1. A method for use in a data communications system having at least one data-communications server that provides a plurality of different data communications services, including routing of data communications on behalf of users associated with a plurality of customer accounts, each customer account having a respective plurality of users and a respective settings file, the method comprising:

recording an audio portion of a selected one of the data communications to or from a user of one of the customer accounts in response to the selected one of the data communications satisfying a set of recording criteria specified in a respective settings file of the customer account, the set of recording criteria for at least one of the customer accounts including for one or more of the plurality of users of the customer account, respective user-level settings indicating criteria for preventing discernable recording of data communications of the user that are selected by the criteria indicated in account-level settings for selecting data communications of the plurality of users of the customer account to be recorded;

for the selected one of the data communications, performing voice recognition to identify words used in the selected one of the data communications; and recording the audio portion of the selected one of the data communications in response to an identified word being included in a list of trigger words specified in the settings file for the corresponding customer account.

2. The method of claim 1, further comprising in response to the set of recording criteria being satisfied:

logging into a data server remote to the at least one data-communications server using login credentials included in the settings file for the customer account; and storing the recorded audio portion of the selected one of the data communications in the data server.

3. The method of claim 1, further comprising, in response to the selected one of the data communications satisfying a set of recording criteria, providing notification to the one or more of the plurality of users in advance that a teleconference will be recorded.

4. The method of claim 1, wherein the plurality of different data communications services includes VoIP (Voice over Internet Protocol) services using the at least one data-communications server and wherein the selected one of the data communications is a VoIP-type communication facilitated via said VoIP services, and wherein the system includes a processing circuit that transcribes the recorded audio portion of the selected one of the data communications.

5. The method of claim 1, wherein the data communications system includes a processing circuit that stores account-level settings indicating when a teleconference is scheduled between one or more of the plurality of users, and the method further includes accessing the stored account-level settings to determine which if any of the data communications are to be recorded.

6. The method of claim 1, wherein the data communications system includes a processing circuit that in response to the set of recording criteria being satisfied, logs into a data server remote to the at least one data-communications server using login credentials included in the settings file for the customer account.

7. The method of claim 6, wherein the recorded audio portion of the selected one of the data communications is stored in the processing circuit, and wherein the criteria indicated in the respective user-level settings is configurable in the settings file by a manager of the customer account.

8. The method of claim 1, wherein the data communications system, in response to a teleconference being scheduled, notifies the one or more of the plurality of users in advance that the teleconference will be recorded.

9. The method of claim 1, wherein for at least one of the plurality of customer accounts, the set of recording criteria indicated in the settings file is satisfied by the selected one of the data communications corresponding to at least one of: being to a number specified in a list indicated in the settings file, and occurring within a time range specified in the settings file.

10. A storage device including instructions which, in response to being executed by computer circuitry, causes a set of steps to be performed as follows:

routing data communications on behalf of users associated with a plurality of customer accounts, each customer account having a respective plurality of users and a respective settings file;

recording an audio portion of a selected one of the data communications to or from a user of one of the customer accounts in response to the selected one of the data communications satisfying a set of recording criteria specified in a respective settings file of the customer account, the set of recording criteria for at least one of the customer accounts including for one or more of the plurality of users of the customer account, respective user-level settings indicating criteria for preventing discernable recording of data communications of the user that are selected by the criteria indicated in account-level settings for selecting data communications of the plurality of users of the customer account to be recorded;

for the selected one of the data communications, performing voice recognition to identify words used in the selected one of the data communications; and recording the audio portion of the selected one of the data communications in response to an identified word being included in a list of trigger words specified in the settings file for the corresponding customer account.

11. A data communications system having at least one data-communications server that provides a plurality of different data communications services, including routing of data communications on behalf of users associated with a plurality of customer accounts, each customer account having a respective plurality of users and a respective settings file, the data communications system comprising:

audio-recording circuitry to record an audio portion of a selected one of the data communications to or from a user of one of the customer accounts in response to the selected one of the data communications satisfying a set of recording criteria specified in a respective settings file of the customer account, wherein the set of recording criteria for at least one of the customer accounts including for one or more of the plurality of users of the customer account, respective user-level settings indicating criteria for preventing discernable recording of data communications of the user that are selected by the criteria indicated in account-level settings for selecting data communications of the plurality of users of the customer account to be recorded; and audio-processing circuitry to, for the selected one of the data communications, perform voice recognition to identify words used in the selected one of the data communications, and to record the audio portion of the selected one of the data communications in response to an identified word being included in a list of trigger words specified in the settings file for the corresponding customer account.

12. The data communications system of claim 11, further comprising in response to the set of recording criteria being satisfied:

logging into a data server remote to the at least one data-communications server using login credentials included in the settings file for the customer account; and storing the recorded audio portion of the selected one of the data communications in the data server.

13. The data communications system of claim 12, wherein the data communications system includes a processing circuit that in response to the set of recording criteria being satisfied, is to log into a data server remote to the at least one data communications server using login credentials included in the settings file for the customer account.

14. The data communications system of claim 13, wherein in operation the recorded audio portion of the selected one of the data communications is stored in the processing circuit, and wherein the criteria indicated in the respective user-level settings is configurable in the settings file by a manager of the customer account.

15. The data communications system of claim 11, wherein the data communications system includes a processing circuit that stores account-level settings to indicate when a teleconference is scheduled between one or more of the plurality of users, and the system further includes circuitry to access the stored account-level settings to determine which if any of the data communications are to be recorded.

16. The data communications system of claim 11, further comprising processing circuitry, in response to the selected one of the data communications satisfying a set of recording criteria, to notify the one or more of the plurality of users in advance that a teleconference will be recorded.

17. The data communications system of claim 11, wherein the plurality of different data communications services includes VoIP (Voice over Internet Protocol) services using the at least one data-communications server and wherein the selected one of the data communications is a VoIP-type communication facilitated via said VoIP services, and wherein the system includes a processing circuit to transcribe the recorded audio portion of the selected one of the data communications.

18. The data communications system of claim 11, wherein the data communications system is to, in response to a teleconference being scheduled, notify the one or more of the plurality of users in advance that the teleconference will be recorded.

19. The data communications system of claim 11, wherein for at least one of the plurality of customer accounts, in operation the set of recording criteria indicated in the settings file is satisfied by the selected one of the data communications being to a number specified in a list indicated in the settings file.

20. The data communications system of claim 11, wherein for at least one of the plurality of customer accounts, in operation the set of criteria indicated in the settings file is satisfied by the selected one of the data communications occurring within a time range specified in the settings file.

* * * * *